Nov. 6, 1934.　　　　E. ROSE　　　　1,980,092
TRIMMING SHEARS
Filed Feb. 7, 1933
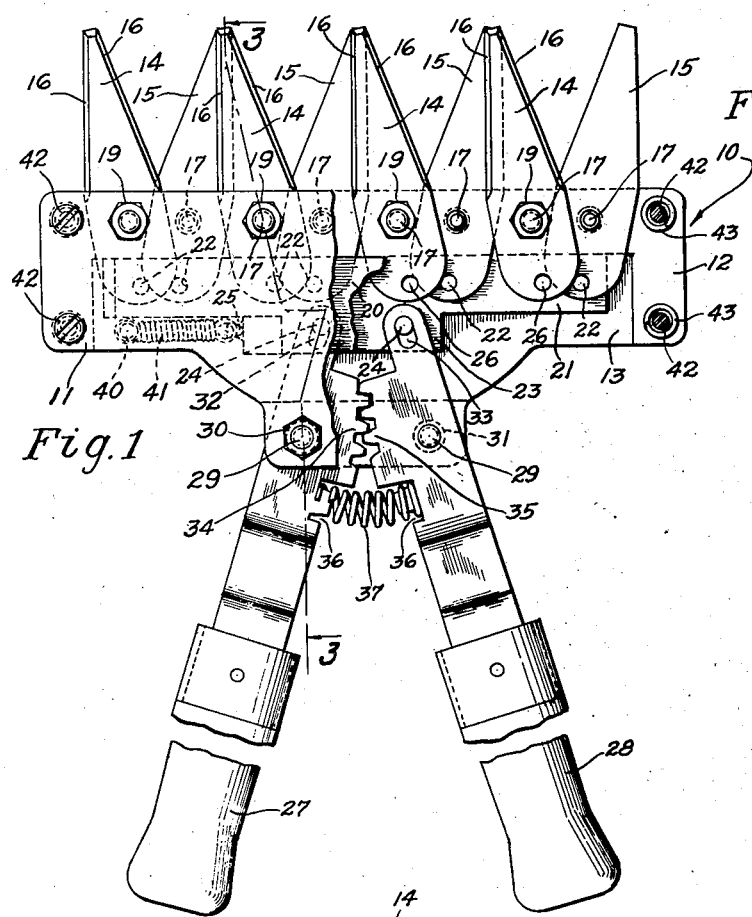
Fig.1
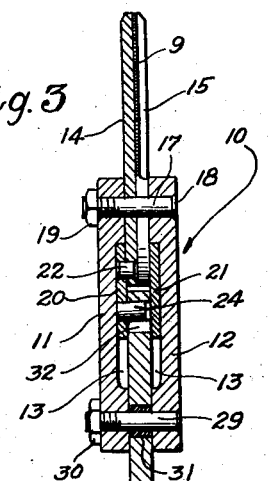
Fig.3
Fig.5
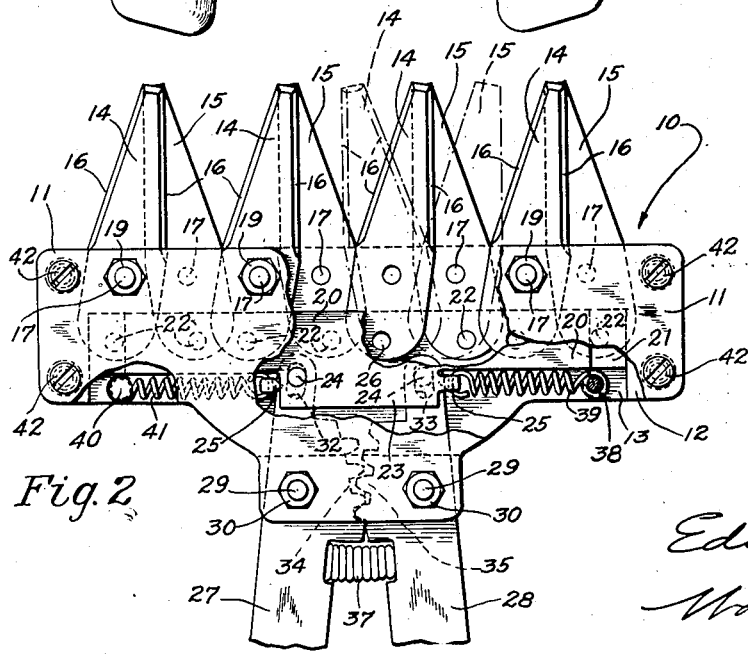
Fig.2
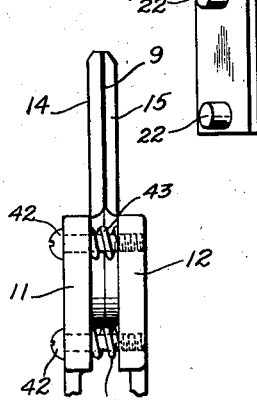
Fig.4
INVENTOR
Edward Rose
BY
Wooster & Davis
ATTORNEYS.

Patented Nov. 6, 1934

1,980,092

UNITED STATES PATENT OFFICE 1,980,092

TRIMMING SHEARS

Edward Rose, Greenwich, Conn., assignor to Philip Milton Martin, Stamford, Conn.

Application February 7, 1933, Serial No. 655,564

6 Claims. (Cl. 30—11)

This invention relates to new and useful improvements in shears and has particular relation to trimming shears for grass and hedges although the principle of the invention is also applicable to hair clippers.

An object of the invention is to provide a multi-blade shear wherein all of the blades are pivoted and are oscillated about their pivots and relative to each other during use of the device whereby a real shearing effect is obtained.

A further object is to provide a shear of improved and simplified construction including but relatively few parts each of which may be of rugged construction whereby the shear will have long useful life and will not be likely to get out of order owing to repeated use.

Other objects and advantages will become apparent from a consideration of the following detailed description taken in connection with the accompanying drawing wherein a satisfactory embodiment of the invention is shown. However, it will be understod that the invention is not limited to the details disclosed but includes all such variations and modifications as fall within the spirit of the invention and the scope of the appended claims.

In the drawing:

Fig. 1 is a plan view, parts being broken away to illustrate details of construction, showing my improved shear with its blades in one extreme position;

Fig. 2 is a somewhat similar view, the blades of the shears being shown in their other extreme position;

Fig. 3 is a vertical sectional view taken substantially along the line 3—3 of Fig. 1;

Fig. 4 is an edge elevational view showing the body of the shear and the shear blades; and Fig. 5 is a perspective view of an operating plate employed.

Referring in detail to the drawing, the improved shears include a frame or body 10 comprising upper and lower or inner and outer plates or plate like members 11 and 12 each recessed in its inner surface as at 13. Mounted on frame 10 and with their inner ends disposed between the plates 11 and 12 of the frame are inner and outer or upper and lower series or sets of shear blades 14 and 15. These shear blades 14 and 15 are exact duplicates of one another and each is a double edged blade its outer or cutting portion having tapered cutting edges 16 as shown. One edge is also preferably serrated or notched as shown at 9 to prevent the articles being cut from slipping along the edge of the blade.

Each shear blade is mounted on a bolt 17, the said bolts passing through the blades intermediate their ends and the bolts at their outer or lower ends may be riveted or headed over as at 18, (see Fig. 3) whereby the bolts are rigidly mounted in the outer or lower plate 12 of the frame. Every other bolt 17 as here disclosed extends through the upper or inner plate 11 and such bolts at their upper or inner ends are screw threaded to receive nuts 19 whereby the pressure between the different pairs of blades 14 and 15 may be adjusted. By reference to the drawing it will be apparent that the blades 14 are arranged in alternate relation to the blades 15 and as will later be more fully described each of the blades, except one end blade of each series, cooperates with the two adjacent blades of the other series.

Plates or slides 20 and 21 are arranged in the recesses 13 of the plates or frame members 11 and 12. That is, plate 20 is arranged in the recess 13 of frame member 11 and plate 21 is arranged in the recess of frame member 12. The plates or slides 20 and 21 are exact duplicates of one another but are arranged in opposite or opposed relation in the frame 10. Since the slide or plates are duplicates a detail description of one will, it is believed, suffice for both, and in Fig. 5 it will be noted that plate 20 includes an elongated plate-like body portion from one surface of which extends four equally spaced pins 22. The slide or plate includes a lateral extension 23 and this extension carries a pin or projection 24 and at one of its ends said extension is provided with a hook-like portion or member 25.

Inwardly of their mounting pivots 17, each of the blades 14 and 15 is provided with an opening 26 and the pins 22 of plate 20 enter into the openings 26 of the blades 14 while the corresponding pins of the plate 21 enter into the openings 26 of the blades 15. The plates or slides 20 and 21 are slidable in the recess 13 and since these slides through the pins 22 are pivotally connected with the inner ends of the blades and since the blades are intermediate their ends pivoted by the bolts or pins 17 it will be apparent that on sliding movements of the plates 20 and 21 back and forth in the direction of their length the blades will be oscillated on their pivots 17.

Means are provided for so reciprocating the slides 20 and 21 and such means includes a pair of handles 27 and 28 which adjacent their inner ends are pivotally mounted on the frame 10 with their inner end portions extending between the plates of said frame, the pivots for the handles being shown at 29. These pivots 29 are in the form of bolts and extend through the plates 11 and 12 and at their upper ends are threaded to receive nuts 30 whereby the plates may be tightened onto the handles to prevent play. If desired, bushings 31 may be provided between the bolts or pivots 29 and the handles. In its inner end portion the handle 27 is provided with an elongated slot 32 receiving the pin 24 of plate 21 in its inner end portion handle 28 is provided with an elongated slot 33 receiving the pin 24 of plate or slide 20.

Handles 27 and 28 are provided with gear segments 34 and 35 respectively which gear segments mesh as clearly shown in Figs. 1 and 2 and it will therefore be apparent that the handles must move together about their respective pivotal mountings 29. Each handle may be provided with a recess 36 the said recesses being arranged in opposed relation, and extending between the handles and having its ends located in the recesses 36 of the respective handles is a coil spring 37 whose obvious purpose and tendency is to maintain the arms spread apart as shown in Fig. 1 and to return them to such position when moved therefrom.

Adjacent the rear edge of the frame the plate 11 carries a stud 38 and anchored at one end to this stud and at its other end to the hook 25 of plate or slide 20 is a coil spring 39. A similar structure comprises a stud 40 carried by the frame plate 12 and a coil spring 41 anchored at one end to stud 40 and this spring is at its other end connected with the hook 25 of plate 21. These coil springs 39 and 41 serve to return the plates 20 and 21 to a normal position when moved therefrom and since such plates are through their pins 24 connected with the inner ends of the handles the springs 39 and 41 serve to assist the spring 37. Machine screws or the like 42 are passed through the end portions of frame plate 11 and threaded into frame plate 12 as best shown in Fig. 4 and about these screws and between the plates there are arranged relatively short coil springs 43 tending to keep the frame plates apart and the relative positions of such plates can, of course, be adjusted by the screws.

In the operation of the shears the handles 27 and 28 are rocked about their pivots 29 toward and from each other. Both handles are operated or manipulated about their pivots with the result that both the slide 20 and the slide 21 are shifted back and forth in their respective recesses 13. As the slides move in one direction they rock their blades to the right and as they move in the opposite direction they rock their blades to the left. Thus all of the blades of each set or series of blades are oscillated about their pivots 17. In one extreme position of the handles the blades are related as shown in Fig. 1 while in the other extreme position of the handles the relationship of the blades is that shown in Fig. 2.

As pointed out above the blades are duplicates of one another and each blade is a double edge blade. As the blades of series 14 move towards the left the blades of series 15 move toward the right and vice versa. Therefore, each blade of the series 14, with the exception of the blade to the extreme left of Figs. 1 and 2, co-operates with two of the blades of series 15. That is, the second blade 14 from the left in Fig. 1 has just finished completing a cutting operation in which it co-operated with the extreme left blade of series 15. On its movement in the opposite direction into the position shown in Fig. 2 it co-operates with the second blade from the left in series 15. This is repeated down the line and in like manner each of the blades of the series 15 with the exception of the blade toward the extreme right co-operates with two blades of the series 14.

Since in the cutting operation each blade is shifted about its pivot a real shearing action is obtained. Moreover, since the blades are double edged each movement of the handles, that is, movement of the handles in either direction, results in a cutting movement of the blades. It is simply necessary to press the handles toward each other rocking them about their pivots 29 and to then shift them apart and in this latter movement springs 37, 39 and 41 will be of assistance. Since the gear segments 34 and 35 of the respective handles are in mesh the handles must move together and movement of the handles in either direction is positively limited by engagement of the ends of one or the other or both of the slides 20 and 21 with the end walls of the respective recesses 13 in which said slides are disposed. On removal of the nuts 19 and 30 and the screws 42 the frame plates 11 and 12 may be readily separated and access had to the interior of the device.

By the double gear arrangement with both blades pivoted friction is reduced to a minimum as there is very little overlap of the blades in any position. This tends for easy operation. Also there is no lost motion or motion when the blades are not cutting as they cut in all movements one way or the other.

It will also be noted that the leverage from the pivots for the handles to the pins 24 in the slides is longer than from the pivots 17 of the blades to their operating pins 22 in the slides. Therefore I secure a large leverage on the blade and so can cut heavier work. With the present construction there is a relative short movement only required for the handles and hands of the operator, and both handles move together and the same amount.

If one blade becomes chipped or broken it is necessary to throw away or renew this blade only. It is therefore not necessary to discard and renew a whole set of blades as where a number of blades are connected in one piece to slide on a similar set. It will also be noted that with four sets of blades as shown there are four cuts when swinging the handles together or when greatest force is possible but that there are only three cuts when the handles are moved apart and operator is capable of exerting only less force. I am not, however, limited to the number of blades shown but may vary the number as desired.

Having thus set forth the nature of my invention, what I claim is:

1. In a shears, a frame comprising a pair of plates arranged in opposing relation and recessed in their opposing faces, two series of double edged blades extending between the frame plates and pivotally mounted intermediate their ends on said frame plates forwardly of the recesses therein with the blades of one series arranged in alternate relation with those in the other series, a pair of handles pivotally mounted on said frame, a pair of slides slidable in said recesses in the frame plates, means pivotally connecting the inner ends of the blades of one of said series with one of said slides, means pivotally connecting the inner ends of the blades of the other of said series with the other of said slides, and means pivotally connecting the respective handles with the respective slides whereby on pivotal movement of the handles toward and from each other said slides are shifted back and forth in their recesses and said blades are oscillated on their mounting pivots to have a blade of one series on its movement in one direction make a shearing cut with a blade of the other series and on its movement in the opposite direction make a shearing cut with a next adjacent blade of said other series.

2. In a shears, a frame comprising a pair of frame plates, two series of double edged blades extending between said frame plates with the blades of one series arranged in alternate relation with those in the other series, bolts extending through the frame plates and individual blades and pivotally mounting the blades, nuts on said bolts for drawing said frame plates against the blades to tension the blades of one series against those of the other series, a pair of handles pivotally mounted on said frame, a pair of slides slidable between the plates of said frame, means pivotally connecting the inner ends of the blades of one of said series with one of said slides, means pivotally connecting the inner ends of the blades of the other of said series with the other of said slides, and means pivotally connecting the respective handles with the respective slides whereby on pivotal movement of the handles toward and from each other said slides are shifted back and forth and said blades are oscillated on their mounting pivots to have a blade of one series on its movement in one direction make a shearing cut with a blade of the other series and on its movement in the opposite direction make a shearing cut with a next adjacent blade of said other series.

3. In a shears, a frame comprising a pair of plates, two series of double edged blades extending between said frame plates with the blades of one series arranged in alternate relation with those in the other series, means passing through the individual blades and pivotally mounting them and connecting said frame plates, said means operable to draw said plates toward one another to tighten them against the blades of the respective series to tension the blades of one series against those of the other series, a pair of handles pivotally mounted on said frame, a pair of slides slidable between the plates of said frame, means pivotally connecting the inner ends of the blades of one of said series with one of said slides, means pivotally connecting the inner ends of the blades of the other of said series with the other of said slides, and means pivotally connecting the respective handles with the respective slides whereby on pivotal movement of the handles toward and from each other said slides are shifted back and forth and said blades are oscillated on their mounting pivots to have a blade of one series on its movement in one direction make a shearing cut with a blade of the other series and on its movement in the opposite direction make a shearing cut with a next adjacent blade of said other series.

4. In a shears, a frame comprising a pair of plates arranged in opposing relation and recessed in their opposing faces, two series of double edged blades extending between said frame plates and pivotally mounted intermediate their ends on said frame plates forwardly of the recesses therein with the blades of one series arranged in alternate relation with those in the other series, a pair of handles pivotally mounted on said frame, a pair of slides arranged one in each of said recesses, a series of pins on each of said slides, said slides arranged with the pins of each slide extending in the direction of the other slide, said slides arranged with the pins of one slide pivotally engaging the inner end portions of the blades of one series and the pins of the other slide pivotally engaging the inner end portions of the blades of the other series, said handles including portions extending into said frame between said slides, and a pin and slot connection between the said portions of the respective handles and the respective slides whereby on pivotal movement of the handles toward and from each other said slides are shifted back and forth in said recesses and said blades are oscillated on their mounting pivots to have a blade of one series on its movement in one direction make a shearing cut with a blade of the other series and on its movement in the opposite direction make a shearing cut with a next adjacent blade of said other series.

5. In a shears, a frame comprising a pair of plates arranged in opposing relation and each having an elongated recess in its inner face, a slide in each of said recesses and each slide lying substantially flush with the inner surface of its plate, two series of individual double edged blades having their inner ends extending between said plates, individual means pivoting the individual blades to the plates intermediate the ends of the blades and forwardly of the recesses in the plates, means pivotally connecting the inner ends of the blades of the respective series with the respective slides, a pair of handles pivoted intermediate their ends to the plates and extending between them, pin and slot connections between the inner ends of the handles and the respective slides whereby on movement of said handles toward and from each other the slides are reciprocated in the recesses and the blades are oscillated about their pivots, and the end walls of the recesses forming stops for the slides to limit their longitudinal movement in each direction.

6. In a shears, a frame, an upper and a lower series of individual double edged blades arranged in alternate relation and pivotally mounted on said frame, a pair of handles pivotally mounted on said frame, means connecting the respective handles with the respective series of blades whereby on movement of the handles toward and from one another the blades are oscillated first in one direction and then in the other direction, and each of said series comprising the same number of blades, and said blades and handles so arranged and connected that on movement of the handles toward one another each blade of each series co-operates with a blade of the other series to make a shearing cut and on movement of said handles from one another one end blade of each series is inoperative.

EDWARD ROSE.